US011958171B2

(12) United States Patent
Lee, IV et al.

(10) Patent No.: US 11,958,171 B2
(45) **Date of Patent: *Apr. 16, 2024**

(54) INSULATED REVERSIBLE SCREWDRIVER

(71) Applicant: Klein Tools, Inc., Lincolnshire, IL (US)

(72) Inventors: Jestwin E. Lee, IV, Lincolnshire, IL (US); Raul Rosales, Lincolnshire, IL (US); Kevin A. Ekdahl, Lincolnshire, IL (US)

(73) Assignee: Klein Tools, Inc., Lincolnshire, IL (US)

( * ) Notice: Subject to any disclaimer, the term of this patent is extended or adjusted under 35 U.S.C. 154(b) by 281 days.

This patent is subject to a terminal disclaimer.

(21) Appl. No.: 17/483,529

(22) Filed: Sep. 23, 2021

(65) Prior Publication Data

US 2022/0009063 A1 Jan. 13, 2022

Related U.S. Application Data

(63) Continuation-in-part of application No. 16/391,788, filed on Apr. 23, 2019, now Pat. No. 11,148,262.

(51) Int. Cl.
*B25B 23/00* (2006.01)
*B25B 15/00* (2006.01)

(52) U.S. Cl.
CPC ........ *B25B 23/0035* (2013.01); *B25B 15/002* (2013.01)

(58) Field of Classification Search
CPC ... B25B 15/002; B25B 15/005; B25B 15/007; B25B 23/0035; B25B 23/16; B25G 1/085
See application file for complete search history.

(56) References Cited

U.S. PATENT DOCUMENTS

| | | | | |
|---|---|---|---|---|
| 2,196,849 | A | 4/1940 | Beeg | |
| 2,472,392 | A | 6/1949 | Alexander | |
| 2,527,492 | A | 10/1950 | Cleary et al. | |
| 4,776,246 | A | 10/1988 | Elliston | |
| 8,856,994 | B2 * | 10/2014 | Powers | B25G 1/085 81/439 |
| 9,156,147 | B2 * | 10/2015 | Peters | B23B 31/22 |
| 9,227,309 | B2 * | 1/2016 | Moss | B25B 23/0035 |
| 9,539,719 | B2 | 1/2017 | Geibel | |
| 9,924,980 | B2 | 3/2018 | Saidha et al. | |
| 10,040,179 | B2 * | 8/2018 | Peters | B23B 31/10 |
| 10,150,205 | B2 * | 12/2018 | Santamarina | B25B 23/12 |

(Continued)

OTHER PUBLICATIONS

U.S. Appl. No. 16/391,788, filed Apr. 23, 2019.

*Primary Examiner* — David B. Thomas

(57) ABSTRACT

A screwdriver device including a handle having an elongate channel extending partially therethrough of the handle and an axial blade member having a first distal end and a second distal end being configured and disposed for sliding through the elongate channel of the handle and a locking mechanism configured and disposed for releasably locking the axial blade member at a first operable position relative to the handle wherein the first distal end is exposed and the second distal end is disposed within the handle. The screwdriver device further includes a first tool head disposed on the first distal end of the blade member and an ejection mechanism configured and disposed within the handle to constantly urge the axial blade member out of the locking mechanism from the first operable position to a second inoperable position.

20 Claims, 13 Drawing Sheets

(56) References Cited

U.S. PATENT DOCUMENTS

| | | | | |
|---|---|---|---|---|
| 10,286,456 | B2 * | 5/2019 | Shi | B25B 23/0035 |
| 10,556,329 | B2 * | 2/2020 | Peters | B23B 31/1071 |
| 11,090,785 | B2 * | 8/2021 | Singh | B23B 31/1072 |
| 11,148,261 | B2 * | 10/2021 | Molina | B25B 23/0035 |
| 11,148,262 | B2 * | 10/2021 | Lee, IV | B25G 3/18 |
| 2005/0066779 | A1 | 3/2005 | Huang | |
| 2011/0079112 | A1 | 4/2011 | Lin | |
| 2018/0015597 | A1 | 1/2018 | Gauthier et al. | |

* cited by examiner

INSULATED REVERSIBLE SCREWDRIVER

CROSS-REFERENCE TO RELATED APPLICATIONS

The instant application is a continuation-in-part of co-pending U.S. patent application Ser. No. 16/391,788, filed on Apr. 23, 2019, which is incorporated herein in its entirety by this reference.

BACKGROUND OF THE INVENTION

Reversible screwdrivers are generally known. Such tools typically include a handle grip having an orifice configured to insert and hold a screwdriver head therein. One example of a known reversible screwdriver is the SIBOLE AGPtEK double blade insulated screwdriver having a push button blade release mechanism with only about a 3.1 inch out of handle extension and a torque limit of about 42 in-lbs. Another example of a known is the STANLEY INC REM which has a higher out of handle extension of about 4 inches and a higher torque of about 136 in-lbs., but is just a single blade insulated screwdriver. In some cases, the single layered insulation cracks or fails under torque for this screwdriver. Further examples of single blade insulated screwdrivers include the WIHA, the WERA KRAFTFORM and the FELO screwdrivers each having disadvantages related to single layer insulation limitations.

Many employers have always been concerned for the safety of their workers. In addition, as disability and medical costs have soared over time, employers can realize a major economic benefit by improving workplace safety. Workers who must service equipment which may be electrically energized also face the constant risk of burns or even electrocution. Many of these accidents and injuries result directly or indirectly from the use of common hand tools in the workplace.

It was reported that insulated hand tools would provide a valuable measure of safety against the following high risk circumstances: one, the chance of electrical shock due to inadvertent contact with live electrical components; two, the possibility of flash-over between phases or phase to ground due to bridging of the live components or from live component to ground by the non-insulated part of the tool, such accidents resulting in risk of burns and eye injury to the user; three, the possibility that the user will inadequately insulate their own personal hand tools with electrical tape or heat shrink materials; and four, the risk of damage to electrical equipment caused by accidental contact of metal tools with energized components. It was further pointed out that since the primary side of transformers was not fused, an inadequately insulated tool dropped in the wrong location could result in massive damage to equipment and a dangerous environment for the worker.

In response to the need for safer hand tools for workers in the electrical fields, the International Electrotechnical Commission (IEC) has developed a standard to cover hand tools for live working up to 1000 volts AC and 1,500 volts DC (IEC 900). Hand tools currently available which conform to the standard are typically a traditional metal shank covered by one or two layers of a plastic insulation material. While this can provide an adequate level of protection against electrical hazards, their long-term reliability is not assured due to the likelihood of cuts, wear, and contaminants becoming embedded in the surface of the insulating material. This presents a major difficulty to employers wishing to provide their workers with safer hand tools. Because of the vulnerability of the insulating material, it will be necessary to frequently inspect and retest the insulating capability of the tool. In practice, this may be virtually impossible due to the large proliferation of hand tools and the difficulties of keeping a log on each and every tool. Furthermore, since a cut which would ruin the insulating capability of the tool could occur at any moment, there is really no safe inspection interval that can ensure that the insulating properties will never be compromised. As stated earlier, contaminates may become embedded in the insulated surface of hand tools will actually aggravate the problem of tool safety for electrical risks.

It is therefore an object of this invention to greatly enhance workplace safety by providing a practical and versatile, self-insulating hand tool, while also providing less contamination, which benefits all workers.

BRIEF SUMMARY OF THE INVENTION

The invention provides a screwdriver device including a handle having an elongate channel extending partially therethrough of the handle and an axial blade member having a first distal end and a second distal end being configured and disposed for sliding through the elongate channel of the handle. The screwdriver device also includes a locking mechanism configured and disposed for releasably locking the axial blade member at a first operable position relative to the handle wherein the first distal end is exposed and the second distal end is disposed within the handle. The screwdriver device further includes a first tool head disposed on the first distal end of the axial blade member and a second tool head disposed on the second distal end of the axial blade member. The screwdriver may also include an ejection mechanism configured and disposed within the handle to constantly urge the axial blade member out of the locking mechanism from the first operable position to a second inoperable position. Further, the axial blade member may comprise insulating material.

The invention also provides a screwdriver device including a handle having an elongate channel extending partially therethrough of the handle and an axial blade member having a first distal end and a second distal end being configured and disposed for sliding through the elongate channel of the handle. The screwdriver device also includes a first tool head disposed on the first distal end of the axial blade member and a locking mechanism configured and disposed for releasably locking the axial blade member at a first operable position relative to the handle wherein the first distal end is exposed and the second distal end is disposed within the handle. The locking mechanism includes a cylindrical blade lock having an opening sized to allow sliding passage of the axial blade member therethrough and a rotatable dial disposed about an end of the cylindrical blade lock where the dial includes cam surfaces configured and disposed to engage a cam lock also disposed about the cylindrical blade lock where the cam lock has cam surfaces disposed therein facing the cam surfaces of the rotatable dial. The locking mechanism also includes a blade lock having an opening sized to allow sliding passage of the axial blade member therethrough and a rotatable dial disposed about an end of the blade lock where the dial includes cam surfaces configured and disposed to engage cam surfaces on a cam lock, the cam lock also disposed about the blade lock. The locking mechanism further includes at least two lock pins engaged with the blade lock for guided movement relative to the blade lock between a locking position and an unlocked position, the cam lock operably engaged with the pins to urge the pins from the locking position to the unlocked position in response to the rotation of the rotatable dial and a biasing spring configured and disposed to bias the lock pins toward the locking position. Further, the axial blade member may comprise insulating material.

The invention further provides a method of securing a blade to a screwdriver device. The method includes providing a handle having an elongate channel extending partially therethrough of the handle and providing an axial blade member having a first distal end and a second distal end being configured and disposed for sliding through the elongate channel of the handle, a first tool head disposed on the first distal end of the axial blade member, and a second tool head disposed on the second distal end of the axial blade member. The method also includes releasably locking the axial blade member at a first operable position relative to the handle wherein the first distal end is exposed and the second distal end is disposed within the handle. The method further includes constantly urging the axial blade member out of the elongate channel upon full insertion therein to cause ejection of the axial blade member from the handle upon release of the locking step.

BRIEF DESCRIPTION OF THE SEVERAL VIEWS OF THE DRAWING(S)

DETAILED DESCRIPTION OF THE INVENTION

All references, including publications, patent applications, and patents, cited herein are hereby incorporated by reference to the same extent as if each reference were individually and specifically indicated to be incorporated by reference and were set forth in its entirety herein.

The use of the terms “a” and “an” and “the” and “at least one” and similar referents in the context of describing the invention (especially in the context of the following claims) are to be construed to cover both the singular and the plural, unless otherwise indicated herein or clearly contradicted by context. The use of the term “at least one” followed by a list of one or more items (for example, “at least one of A and B”) is to be construed to mean one item selected from the listed items (A or B) or any combination of two or more of the listed items (A and B), unless otherwise indicated herein or clearly contradicted by context. The terms “comprising,” “having,” “including,” and “containing” are to be construed as open-ended terms (i.e., meaning “including, but not limited to,”) unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., “such as”) provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Figure 1:
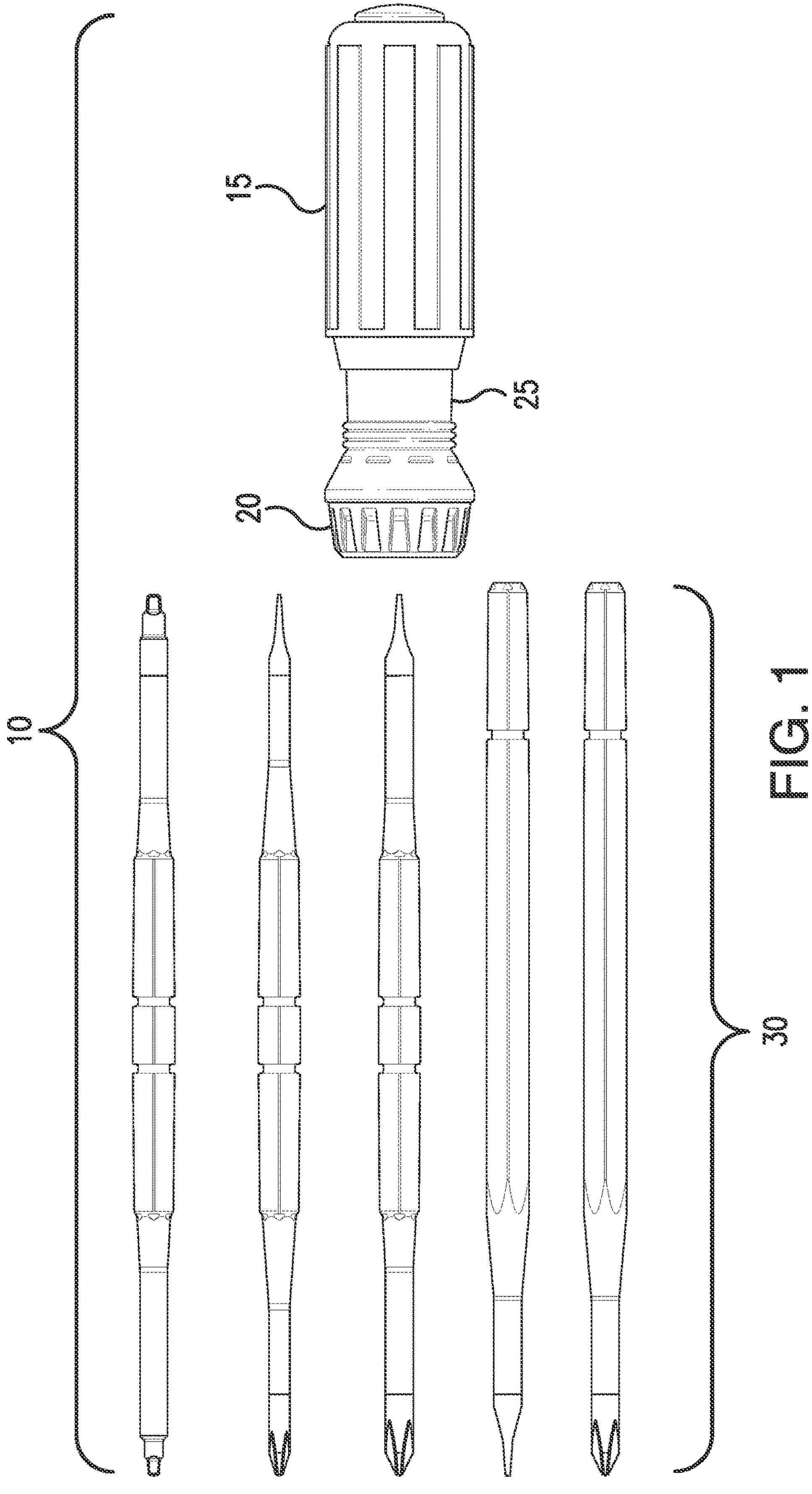
FIG. 1 is a plan view of insulated single-end and dual-end screwdriver blades and an accompanying screwdriver handle according to an embodiment.

Referring now to FIG. 1, there is a reversible insulated screwdriver 10 having a grip handle 15, a locking mechanism 19 including a 360-degree rotatable dial 20 and a lockable blade housing 25, and a plurality of axial blade members 30. The plurality of axial blade members 30 may comprise single blade tool head types: Phillips head (PH1, PH2) and slotted head (¼ inch, 1⁄16 inch) or dual-ended blade head types: Phillips head (PH1) and 3⁄16 inch slotted head, Phillips head (PH2) and ¼ inch slotted head and/or square heads (SQ1, SQ2), for example. It is understood that any head type may be configured to the plurality of axial blade members 30 as needed by a user. In some embodiments, blade members 30 may be insulated or non-insulated depending on the usage needs or requirements.

In certain embodiments, each of the plurality of axial blade members 30 are configured to be inserted and locked within housing 25 via the locking mechanism 19, as further described below herein in connection with FIGS. 3A-11B. Housing 25 may comprise an American Society for Testing and Materials (ASTM) F1505 handle and the blade members 30 may be configured to be fitted and used therein.

Figure 2:
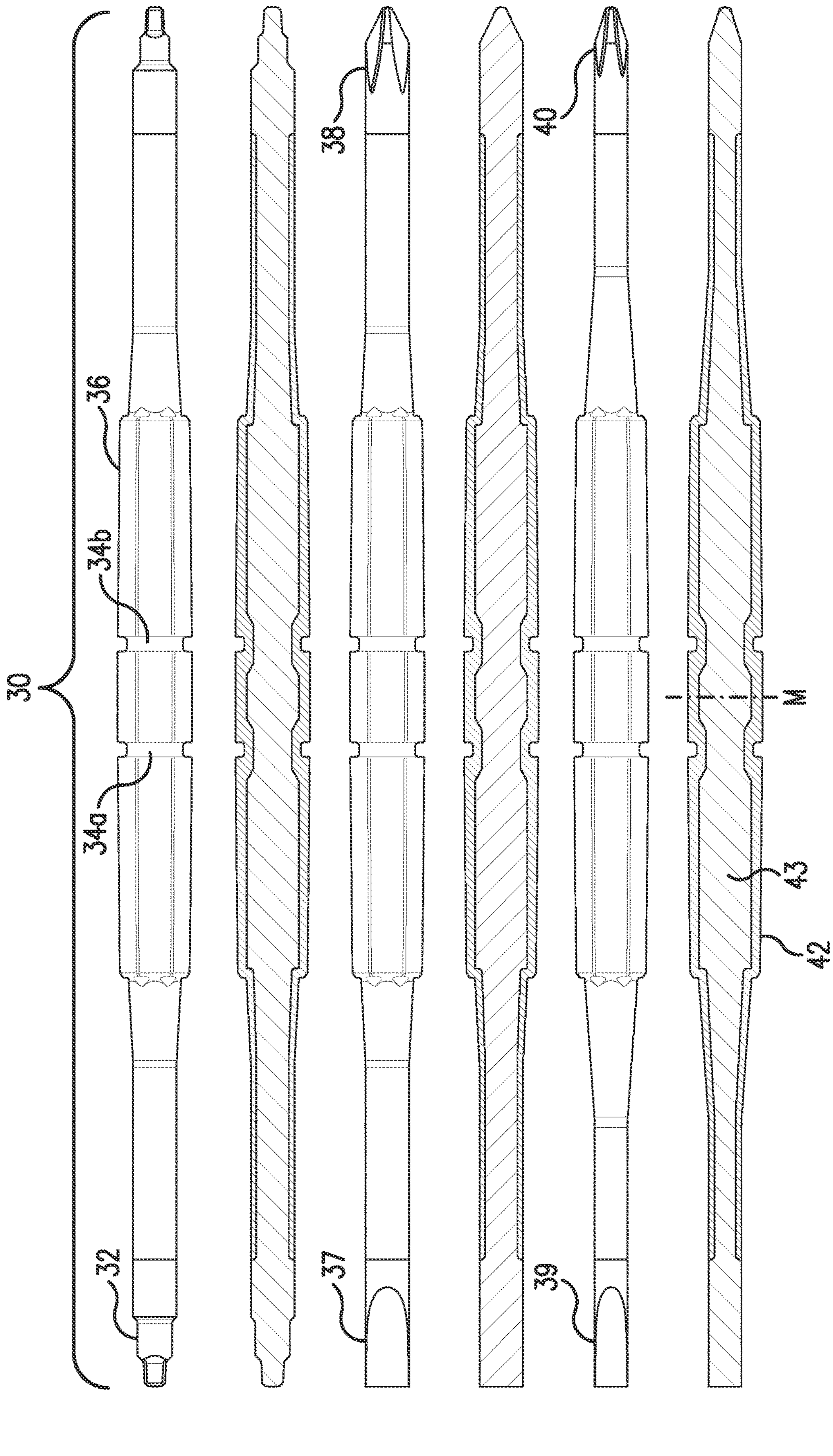
FIG. 2 is a plan view and cross sectional view of insulated dual-end screwdriver blades according to an embodiment.

Referring now to FIG. 2, there is a plan view and cross sectional view of the plurality of axial blade members 30 having a central portion 36 extending longitudinally from a midpoint M of each blade 30 and at least one blade tool head comprising a square head 32, a 3⁄16 inch slotted head 37, a ¼ inch slotted head 39, a PH2 Phillips head 38 and a PH1 Phillips head 40. Each blade member 30 may include at least one annular lock groove (34*a*, 34*b*) disposed proximal central portion 36 and about its circumference. Central portion 36 may be configured as an angled geometrical profile, such as hexagonal, to provide torque to the blade members 30. Further, each blade may comprise an outer layer 42 which may be an insulating material and an inner core layer 43 which may be made of a metal such as steel. The insulating material of outer layer 42 may comprise polypropylene for durability and electrical insulation.

Figure 3A:
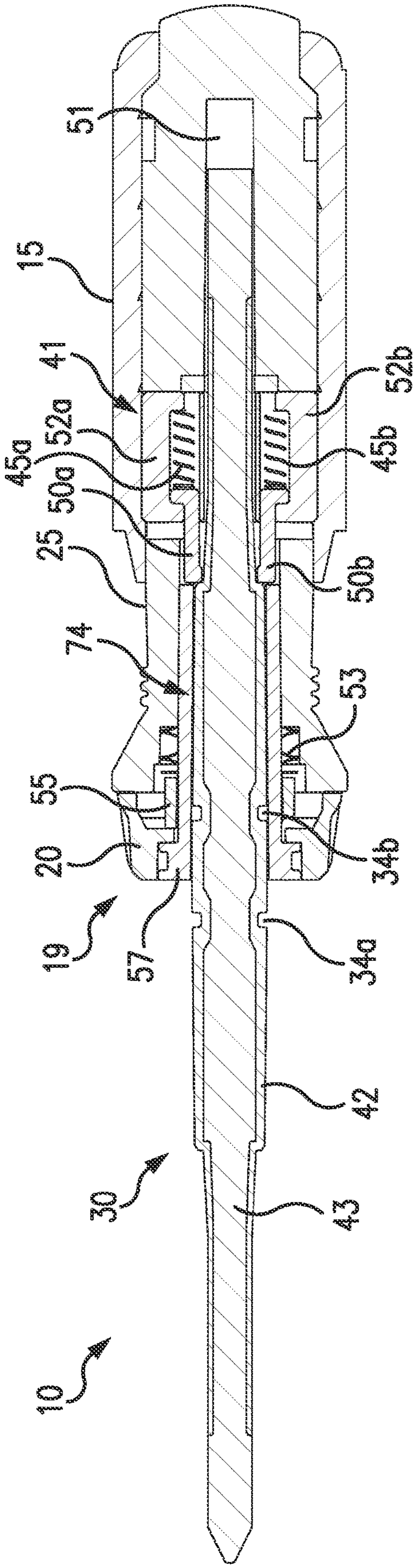
FIG. 3A is a cross sectional view of an insulated reversible screwdriver with the dual-end screwdriver blade partially inserted into a handle according to certain embodiments.
Figure 3B:
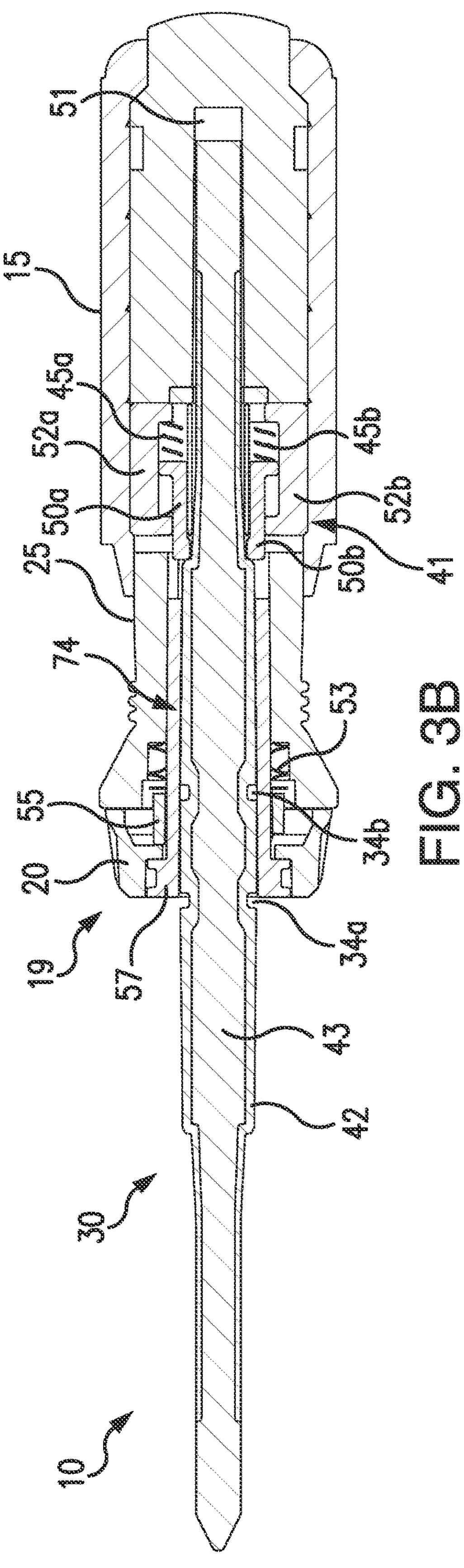
FIG. 3B is a cross sectional view of an insulated reversible screwdriver with the dual-end screwdriver blade fully inserted into a handle according to an embodiment.

Referring now to FIGS. 3A and 3B, there is a cross sectional view of the insulated reversible screwdriver 10 with a dual-end screwdriver axial blade member 30 inserted into handle 15 according to certain embodiments. FIG. 3A shows the blade member 30 partially inserted into the handle 15 while FIG. 3B shows the blade at 30 fully inserted into the handle 15. Screwdriver 10 may include as shown in cross section, handle grip 15, dial 20, housing 25 and blade member 30. Blade member 30 may have an outer insulation layer 42, an inner core layer 43 and annular lock grooves 34*a*, 34*b* as shown. Insulation layer 42 is ASTM rated at or above 1000V of protection for safety and may comprise polypropylene. Housing 25 may include disposed therein a blade lock 57 configured to hold and lock blade member 30 within its channel 74. Channel 74 may be configured to conform with central portion 36 of blade member 30 to provide a snug fit for torsional force between blade lock 57 and housing 25. Housing 25 is configured to be capped at one end by the dial 20 in combination with a cam lock 55 configured to engage dial 20, further described below. Housing 25 also includes a blade receiving orifice 51 disposed therein along a central axis configured to receive and hold blade member 30 as shown.

An ejection mechanism 41 may be included in housing 25 to urge the blade members 30 out of the handle 15 when they aren't locked by locking mechanism 19. The ejection mechanism 41 may include a pair of biasing springs 45*a* and 45*b*, each disposed within a corresponding ejector housing 52*a* and 52*b*. As best seen in FIG. 5B, each ejector housing 52*a* and 52*b* may be configured as a two piece construction with a pair of housing members 48 and 49 that snap together to form the housing 52*a* or 52*b*. Each biasing spring 45*a* and 45*b* abuts against a corresponding ejector member 50*a* and 50*b*, which engage central portion 36 of blade member 30 to eject blade member 30 from channel 74 once unlocked from blade lock 57.

Figure 4A:
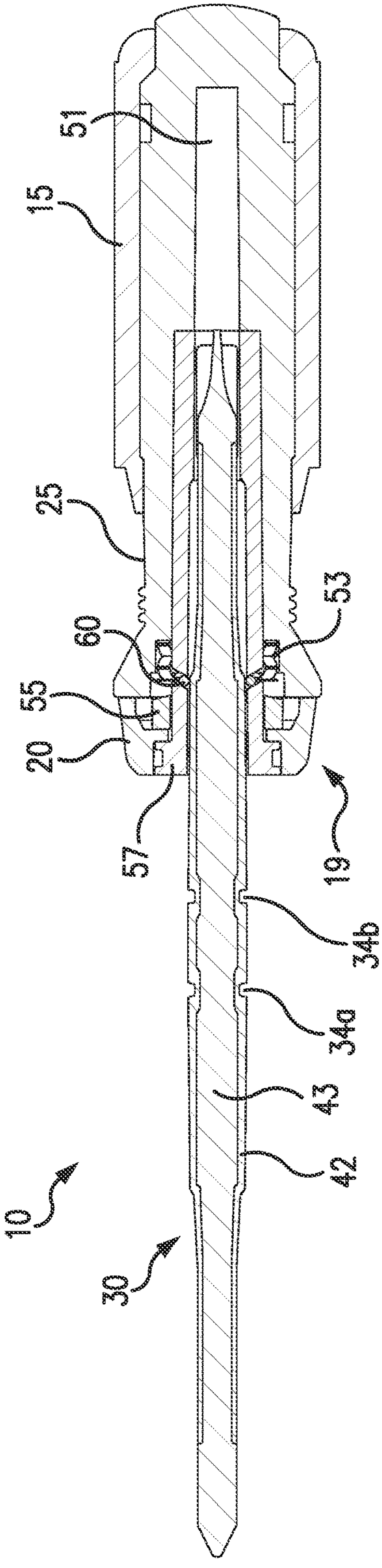
FIG. 4A is a cross sectional view rotated 90 degrees from FIG. 3A of an insulated reversible screwdriver with the dual-end screwdriver blade partially inserted into a handle in an unlocked position according to certain embodiments.
Figure 4B:
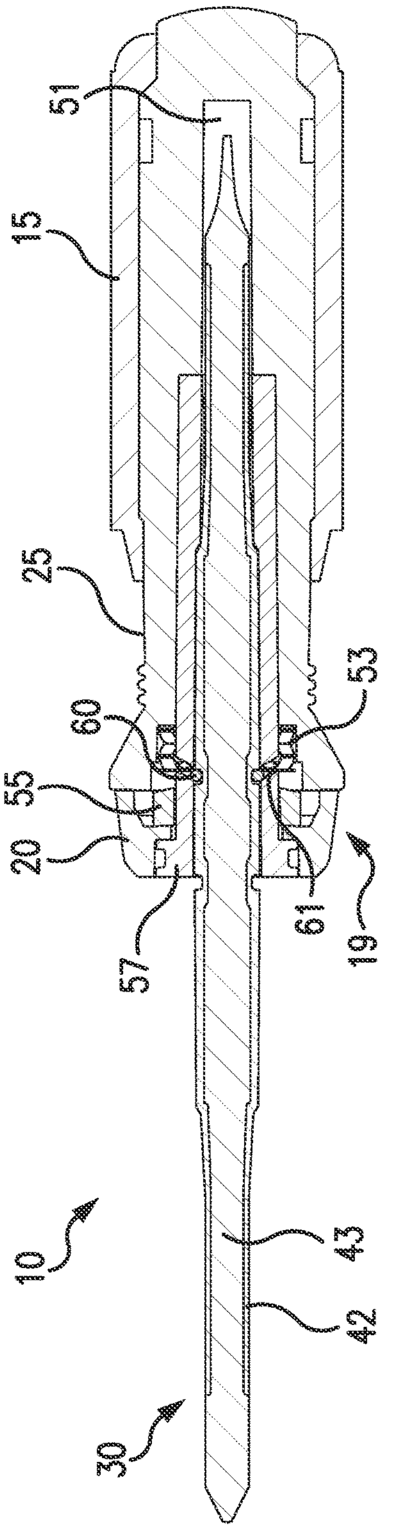
FIG. 4B is a cross sectional view rotated 90 degrees from FIG. 3B of an insulated reversible screwdriver with the dual-end screwdriver blade fully inserted into a handle in a locked position according to an embodiment.

Referring now to FIGS. 4A and 4B, there is a cross sectional view of the insulated reversible screwdriver 10 as shown in FIGS. 3A and 3B but rotated 90 degrees about its longitudinal axis relative thereto and with the components of the ejection mechanism 41 removed. FIG. 4A shows the blade member 30 partially inserted into the handle 15 with annular lock grooves 34*a* and 34*b* exterior to housing 25 and handle 15, while FIG. 4B shows the blade member 30 fully inserted into the housing 25 and handle 15. FIGS. 4A and 4B show that the locking mechanism 19 may include two lock pins 60 disposed in angled slots 61 formed in blade lock 57, with FIG. 4A showing the pins 60 in a first (unlocked) position and FIG. 4B showing the pins 60 in a second (locking) position. As shown in FIG. 4B, the pins 60 are further engaged and disposed within the annular lock groove 34*b* of the blade member 30 to lock and hold the blade member 30 within handle 15.

Figure 5A:
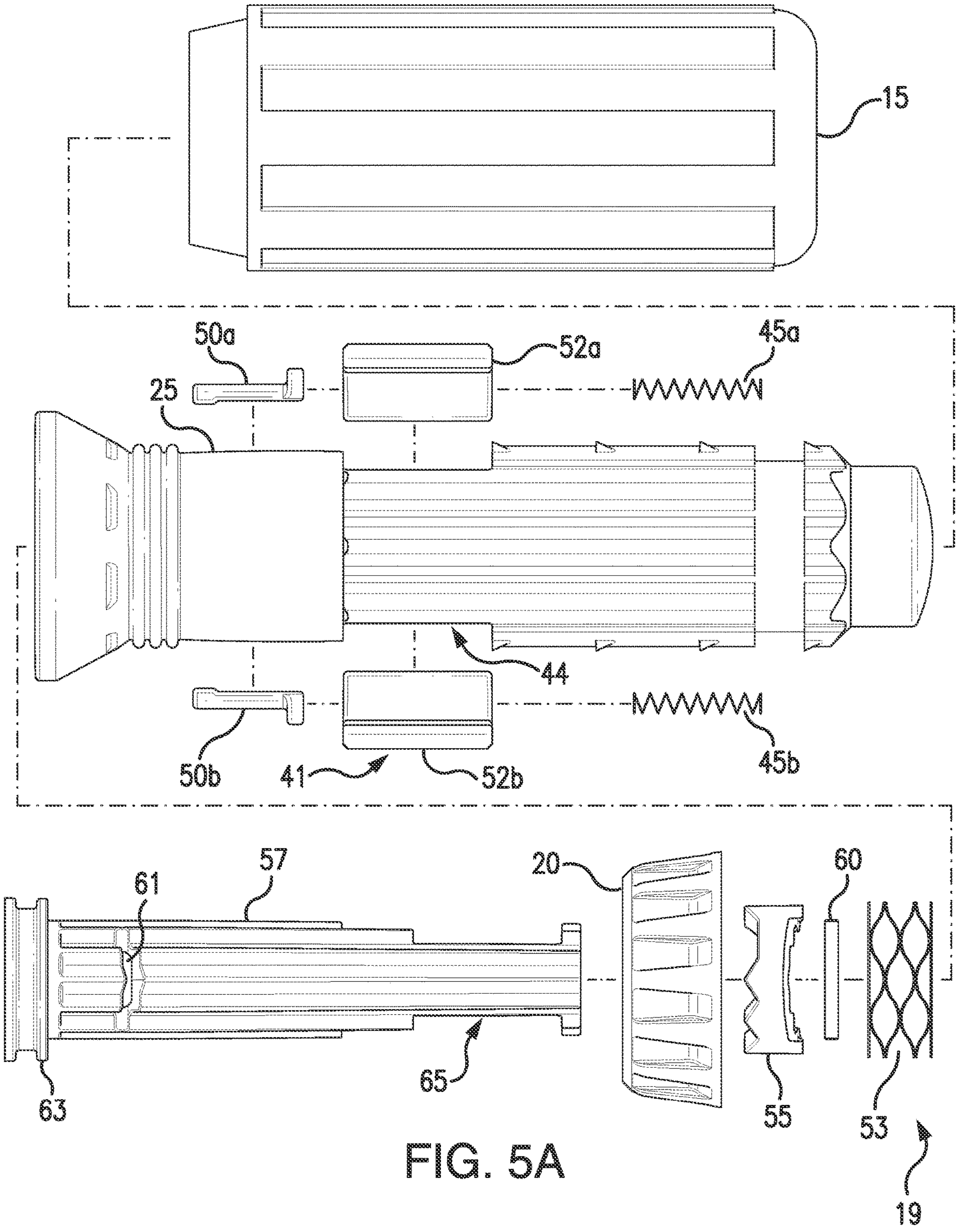
FIG. 5A is an exploded view of a screwdriver handle according to certain embodiments.
Figure 5B:
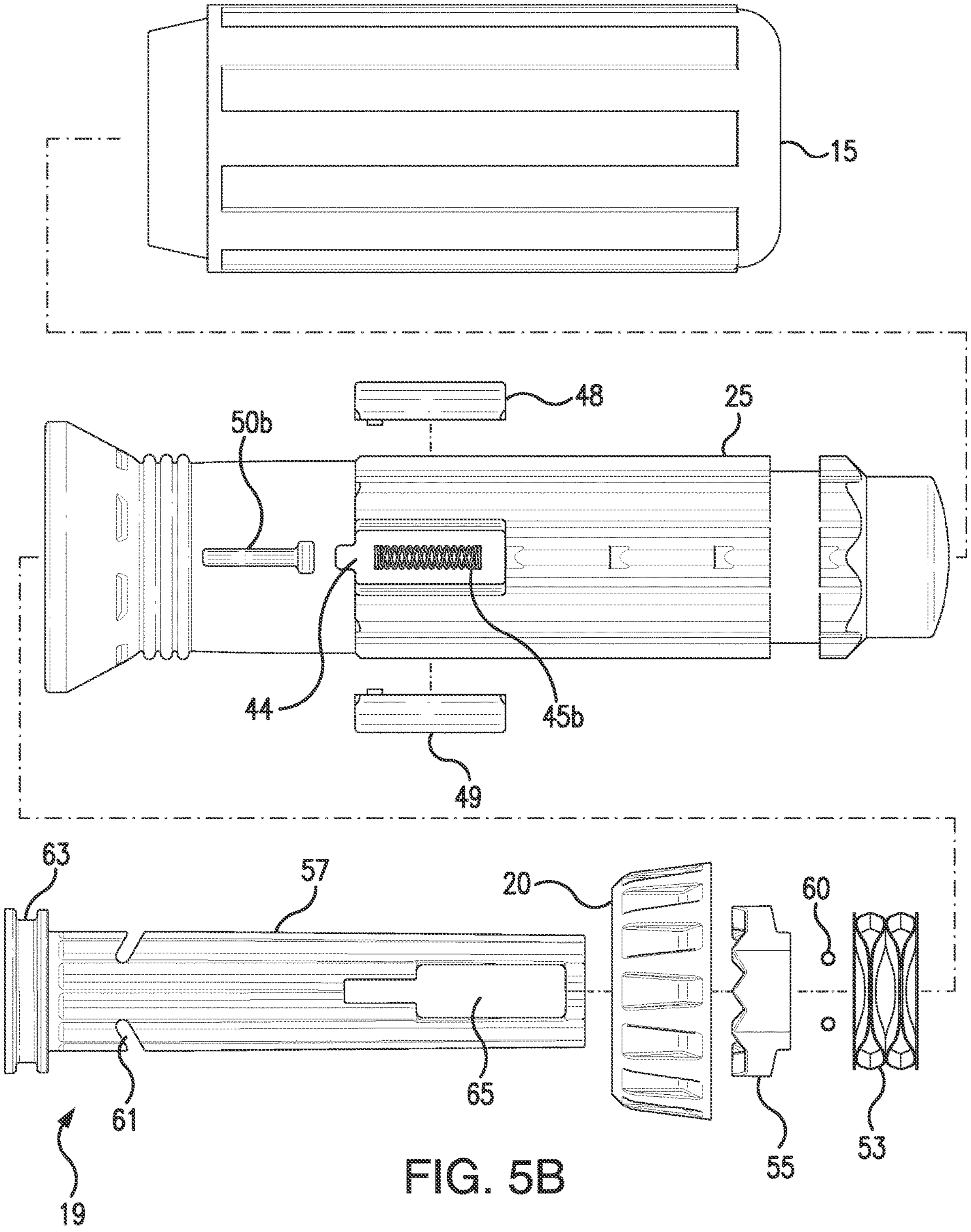
FIG. 5B is an exploded view rotated 90 degrees from FIG. 5A of the screwdriver handle according to an embodiment.

Referring now to FIG. 5A, there is an exploded view of a screwdriver handle 15 and housing 25 according to certain embodiments. FIG. 5A shows separately the blade lock 57 having the angled slots 61 and an opening 65 disposed therein, the dial 20, the cam lock 55, the pins 60 and the biasing spring 53. Also, FIG. 5A illustrates ejector biasing springs 45*a* and 45*b*, ejector members 50*a* and 50*b*, and ejector housings 52*a* and 52*b*. FIG. 5B illustrates an exploded view of a screwdriver handle 15 and housing 25 but rotated 90 degrees about its longitudinal axis relative to FIG. 5A. FIG. 5B shows ejector biasing spring 45*b*, ejector member 50*b*, housing members 48 and 49 that join to form the ejector housing 52*b* with the biasing spring and ejector member 50*b* carried within the ejector housing 52*b*, and the opening 44 which is configured to receive each of the ejector housings 52*a* and 52*b* with the springs 45*a* and 45*b* and the ejector members 50*a* and 50*b* carried therein. Further, opening 65 of blade lock 57 may coincide and align with opening 44 in some embodiments to receive the housings 52*a* and 52*b* with the springs 45*a* and 45*b* and ejector members 50*a* and 50*b* carried therein. The engagement of the housings 52*a* and 52*b* in the aligned openings 44 and 65 serve to hold the blade lock 57 in position within housing 25 upon assembly with the handle 15.

Figure 7A:
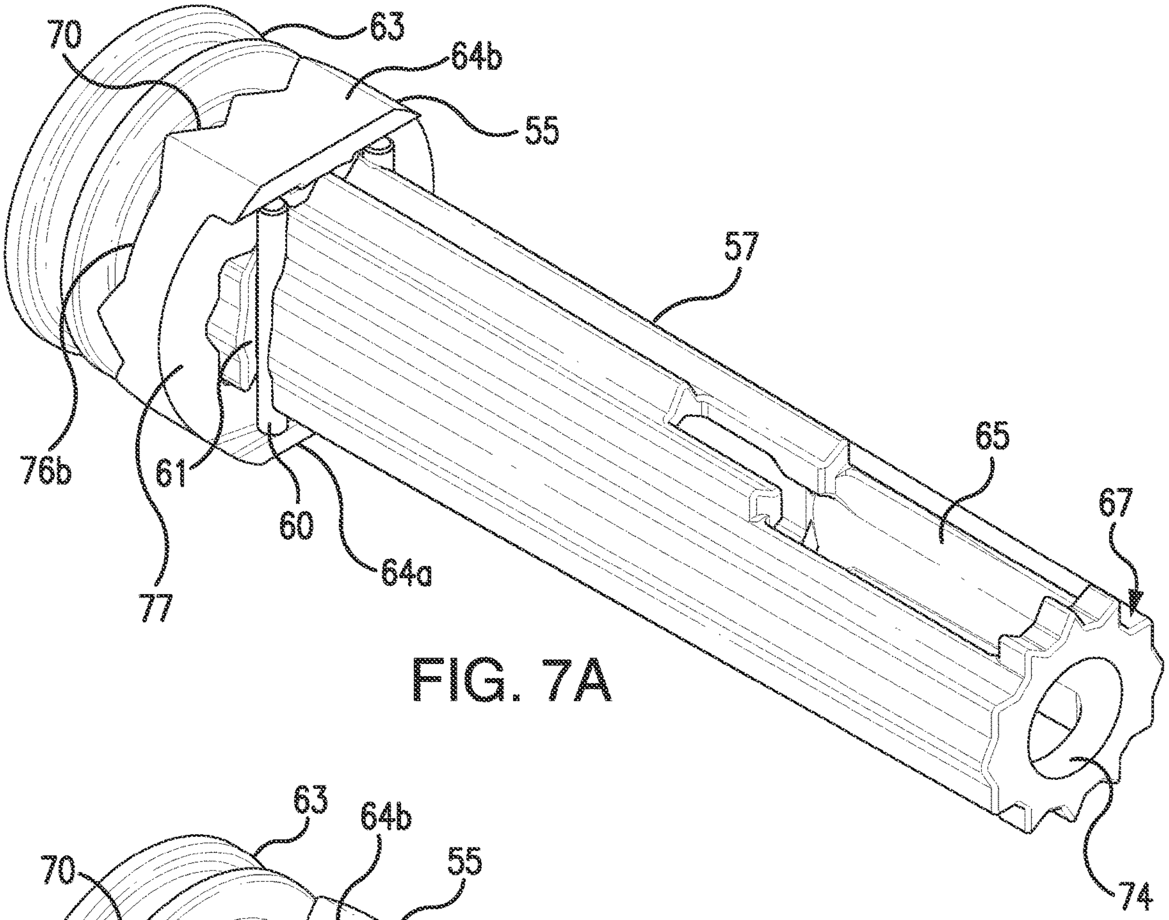
FIG. 7A is a perspective view of a combination of the screwdriver blade lock of FIG. 6A and a locking cam with lock pins in a first position according to certain embodiments.
Figure 7B:
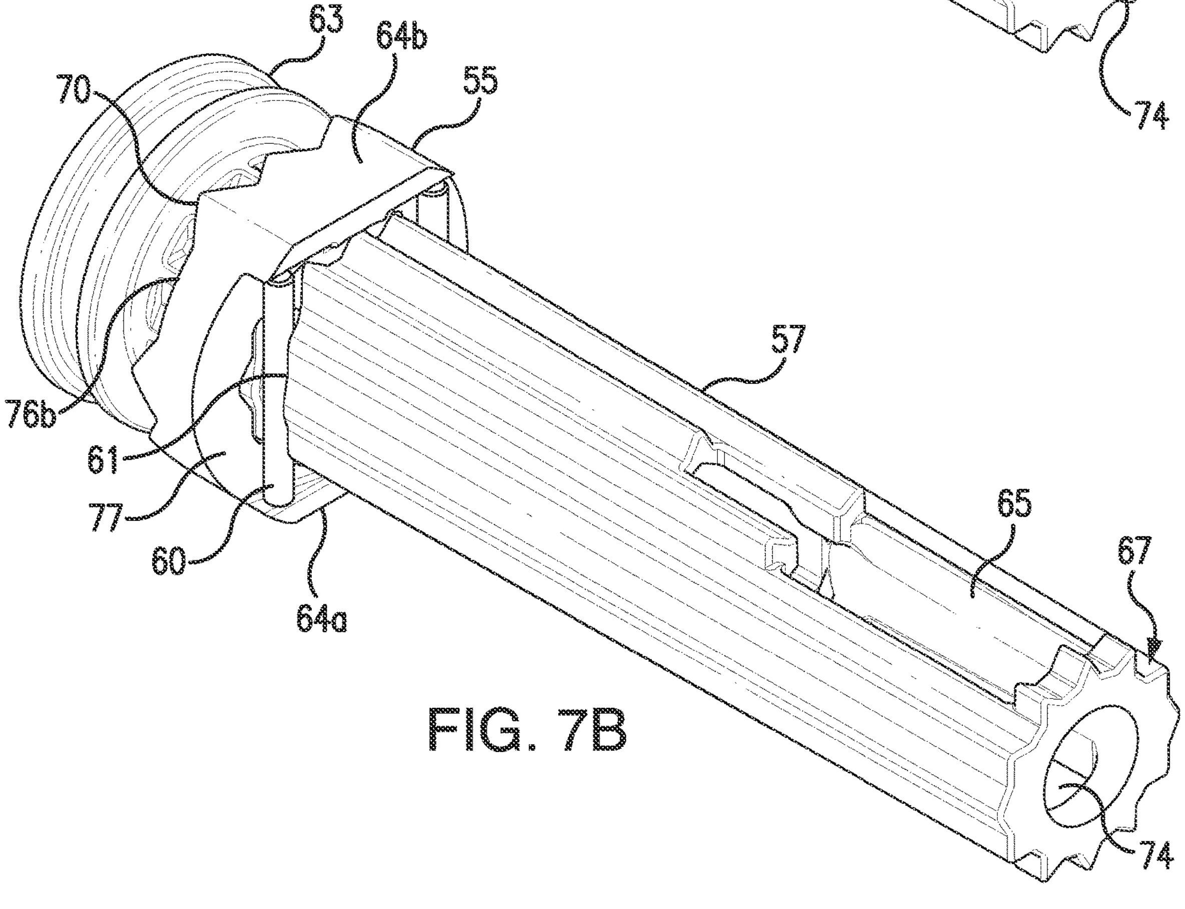
FIG. 7B is a perspective view of a combination of the screwdriver blade lock of FIG. 6A and a locking cam with lock pins in a second position according to an embodiment.

In certain embodiments, housing 25 includes longitudinal grooves and ribs configured to mesh with complimentary longitudinal grooves and ribs disposed within handle 15 when assembled to provide torsional force upon use of screwdriver 10. Further, blade lock 57 includes longitudinal grooves and ribs at 67 as shown in FIGS. 7A and 7B discussed below to mesh with a complimentary longitudinal grooves and ribs disposed within housing 25 when assembled to provide torsional force upon use of screwdriver 10.

In some embodiments blade lock 57 and housing 25 may be formed from extruded polymer forms. In some embodiments, blade lock 57 and housing 25 are comprised of an engineering thermoplastic, for example, polyoxymethylene (POM) material for its durability and low friction coefficient properties to hold blade member 30 and allow blade member 30 to easily glide in and out of blade lock 57 via channel 74 when locking or unlocking blade member 30 therein.

Figure 6A:
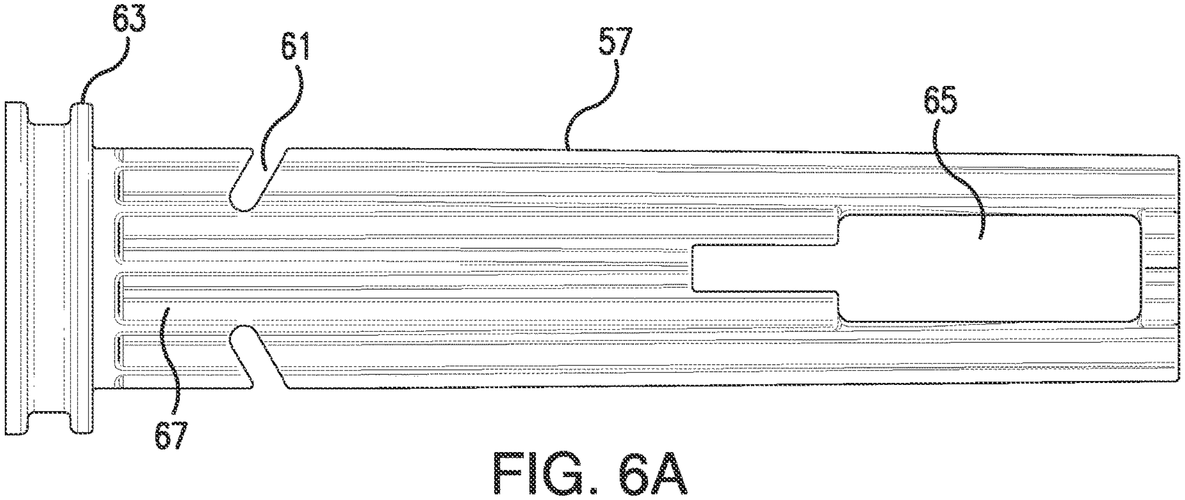
FIG. 6A is a plan view of a screwdriver blade lock according to certain embodiments.
Figure 6B:
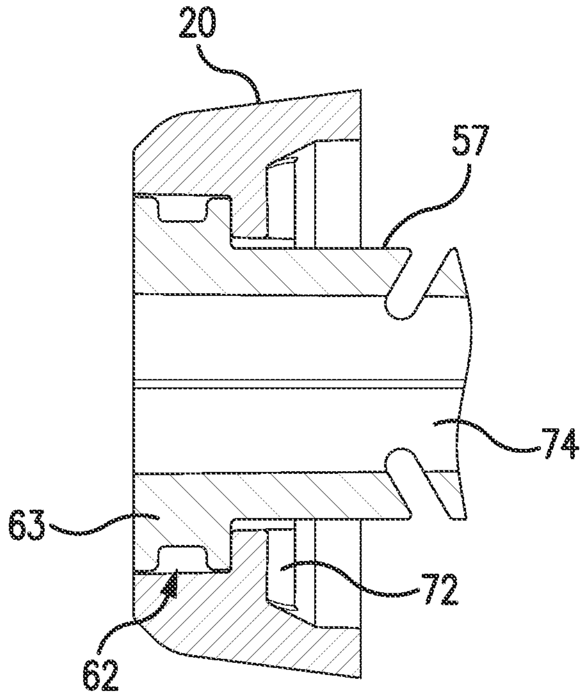
FIG. 6B is a cross sectional view of a combination of a 360-degree rotatable dial and the screwdriver blade lock of FIG. 6A according to an embodiment.

Referring now to FIG. 6A, there is a screwdriver blade lock 57 according to certain embodiments. Blade lock 57 comprises angled slots 61 configured to engage lock pins 60 disposed within handle 15 for guided movement between the first (unlocked) position and the second (locking) position. Blade lock 57 also comprises the plurality of grooves and ribs shown 67 configured to hold blade lock 57 in place within the housing 25 and the handle 15 against torsional forces placed on blade member 30 during use as discussed above. Further, blade lock 57 may include a flange portion 63 configured to mount and hold dial 20 for rotational movement about blade lock 57 as shown in FIG. 6B. Blade lock 57 may further comprise the opening 65 which is configured to coincide and align with the opening 44 in some embodiments to accommodate the ejection mechanism 41 in the form of the housings 52*a* and 52*b* carrying the spring 45*a* and 45*b* and the ejector members 50*a* and 50*b* and to further hold blade lock 57 in position against any applied axial forces within housing 25 upon assembly and during use.

Referring now to FIG. 6B, there is a cross sectional view of a combination of the 360-degree rotatable dial 20 and the screwdriver blade lock 57 of FIG. 6A according to an embodiment. In FIG. 6B, there is the 360-degree rotatable dial 20, which is configured to rotate about flange portion 63, which is disposed within recess 62 of dial 20. Further, blade lock 57 may include a central axial channel 74 configured to hold blade member 30 upon insertion into handle 15. Channel 74 may be configured to coincide with a transverse profile of blade member 30 (e.g., hexagonal) in order to provide torsional reactive force to blade member 30 during use. Further, dial 20 may include axial facing, tooth shaped, cam surfaces 72 configured engage similar cam surfaces on the 70 on the locking cam 55 to create axial forces during user rotation of dial 20 to cause cam 55 to move axially towards handle 15 against the bias force of the spring 53 to thereby force the pins 60 to move in the slots 61 from the second (locking) position to the first (unlocked) position.

Figure 11A:
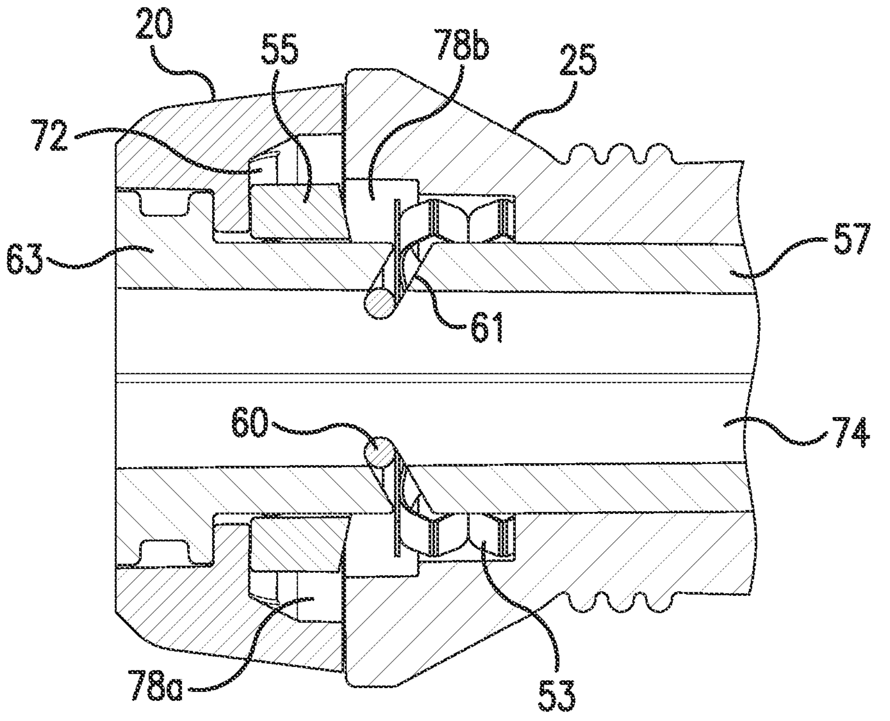
FIG. 11A is a cross sectional view of a screwdriver blade locking mechanism in a first position according to certain embodiments.

The above described actuation is better illustrated in FIGS. 7A, 7B, 11A and 11B. FIGS. 7A and 11A show the locking cam 55 with lock pins 60 in the second (locking) position within angled slots 61 with portions of each pin 60 extending into the channel 74. When the dial 20 is rotated by a user, the cam surfaces 72 on the dial 20 engage with the cam surfaces 70 disposed on a distal end of cam 55 to force the locking cam 55 and the pins 60 to the first (unlocked) position shown in FIGS. 7B and 11B. Further rotation of the dial 20 moves the cam surfaces 72 to a position where the locking cam 55 and the pins 60 are forced back to the second (locking) position by the bias force of the spring 53.

As best seen in FIGS. 8A to 9B, the locking cam 55 may further include flat peripheral side surfaces 64*a*, 64*b* and a plurality of spaced apart flat surfaces 76*a*, 76*b*, 76*c* circumferentially spaced within the cam surfaces 70 and configured to allow clearances when assembled with dial 20 as described below herein. These clearances allow for debris to fall without interfering with cam surfaces 70, 72. Locking cam 55 may also include a recess portion 77 having a cam surface configured to engage pins 60 for movement between the locking and unlocked positions discussed above, and further having shoulders that retain the pins 60 against movement along their longitudinal axes from the slots 61.

Figure 8A:
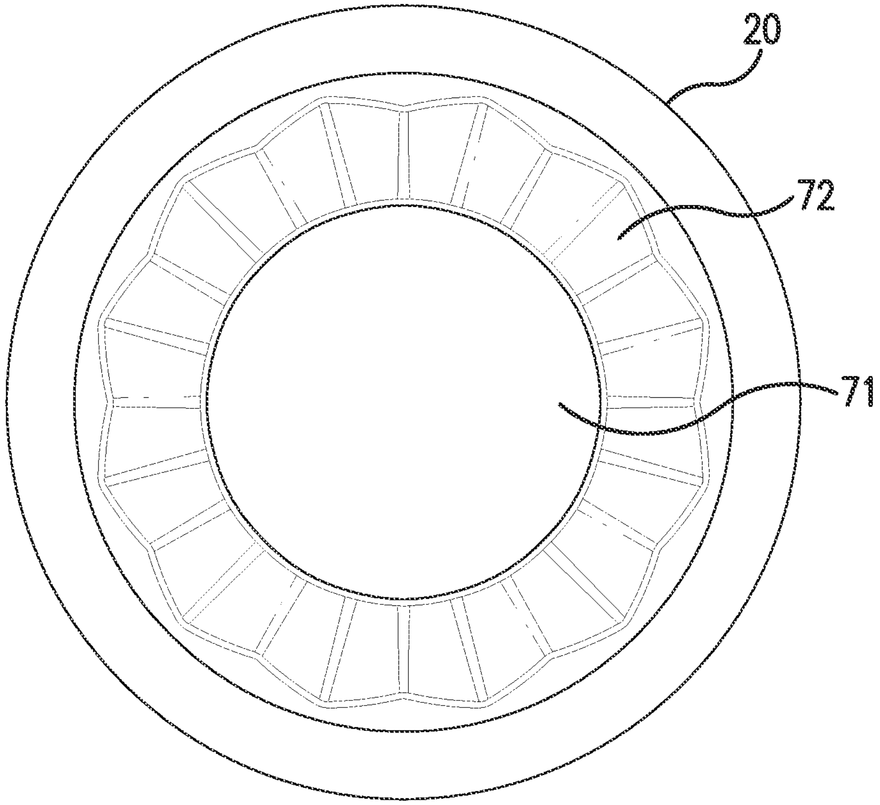
FIG. 8A is a plan view of the 360-degree rotatable dial of FIG. 6B according to certain embodiments.
Figure 10A:
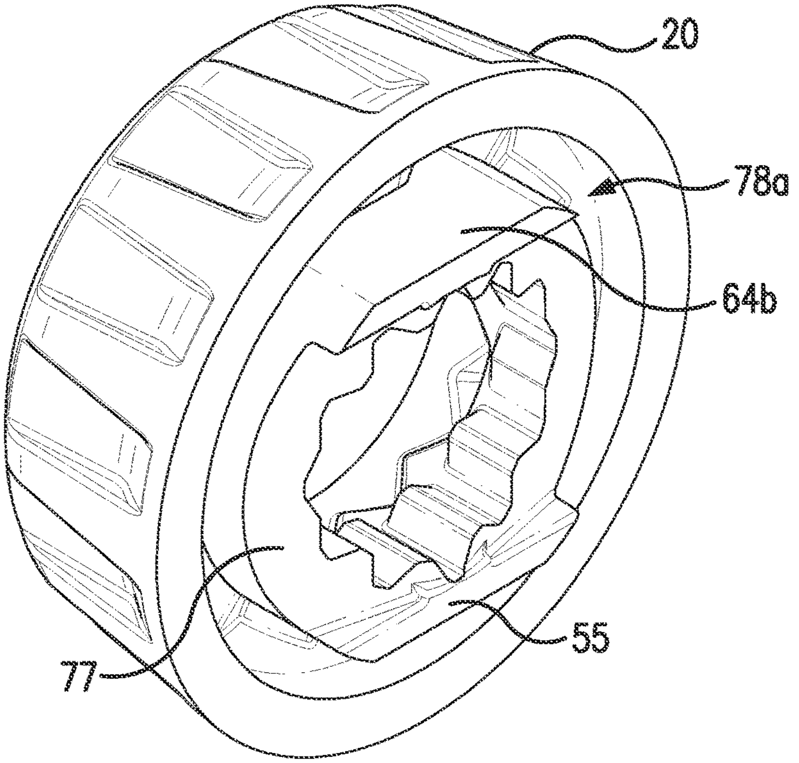
FIG. 10A is a perspective view of the combination of the 360-degree rotatable dial with the locking cam fully inserted into the rotatable dial according to certain embodiments.
Figure 10B:
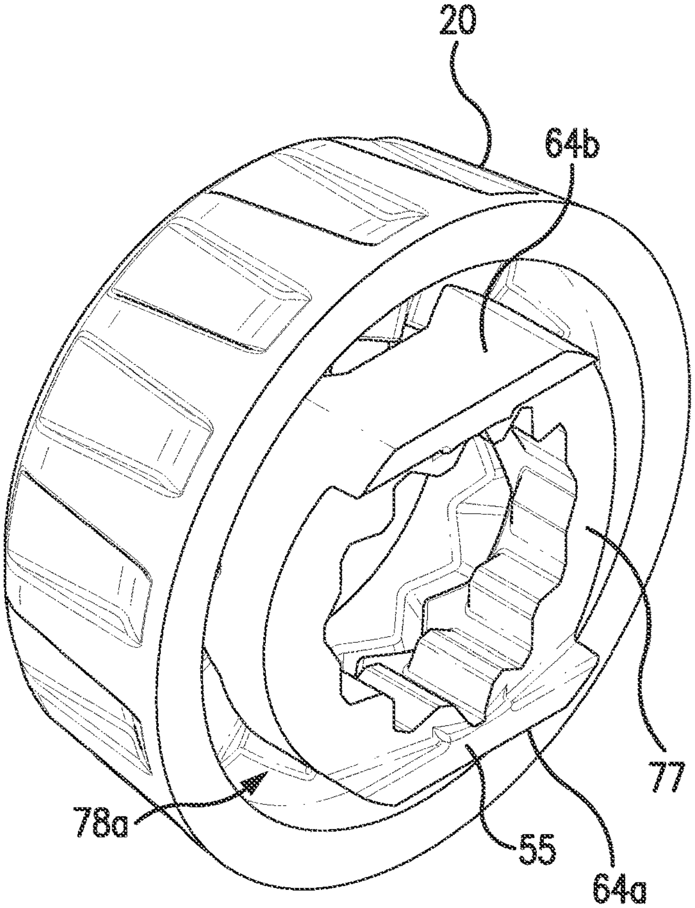
FIG. 10B is a perspective view of the combination of the 360-degree rotatable dial with the locking cam partially inserted into the rotatable dial according to an embodiment.

Referring now to FIG. 8A, there is the dial 20 comprising a central orifice 71, which is coaxial to channel 74 of blade lock 57, and the plurality of cam surfaces 72 disposed along an inner circumferential portion of dial 20, as shown. As previously discussed, the cam surfaces 72 are configured to mesh with cam surfaces 70 of locking cam 55 allowing dial 20 to rotate past the release point of pins 60 to engage another locking valley of cam surfaces 70. Further, again as previously discussed, dial 20 includes a self-cleaning feature such that when rotating dial 20 past the release point with locking cam 55, debris is allowed to fall into gaps 78*a*, 78*b* created by flat surfaces 64*a*, 64*b* and away from contact points between blade lock 57 and locking cam 55, as best seen in FIGS. 10A and 10B. Also, cam 55 is undersized to provide more clearance and includes fewer cam surfaces 70 when compared to the cam surfaces 72 of the dial 20 to allow debris to fall into gaps 78*a*, 78*b* via at least flat surfaces 64*a*, 64*b*, 76*a*, 76*b* and 76*c* without damaging screwdriver 10, as shown in FIGS. 10A to 11 B.

Figure 8B:
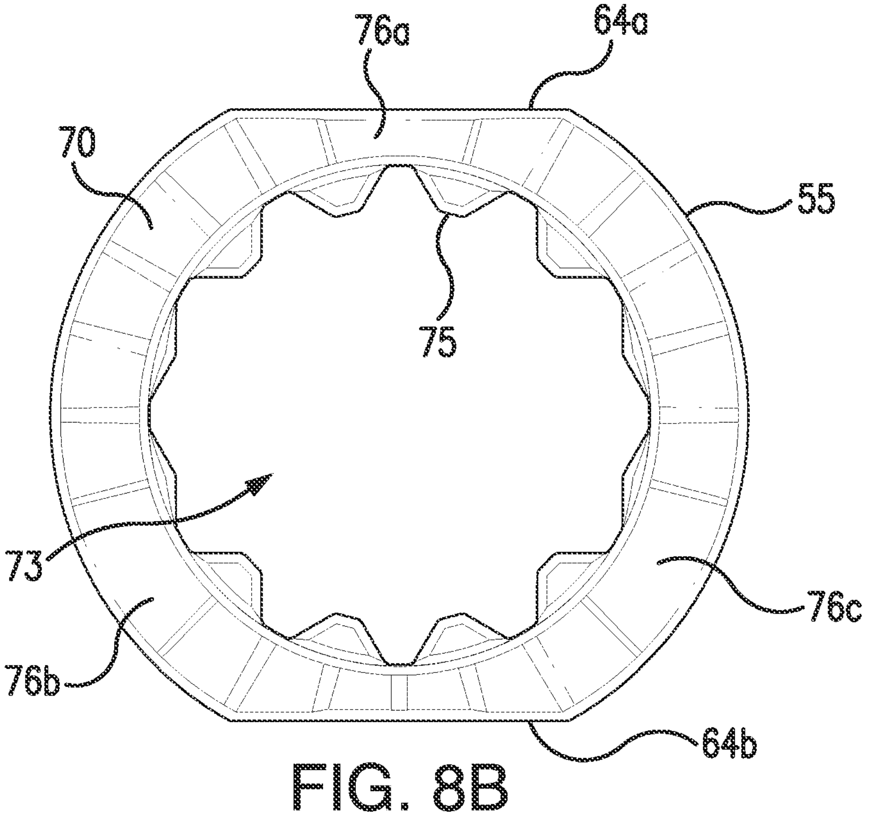
FIG. 8B is a plan view of the locking cam of FIG. 7A according to an embodiment.
Figure 11B:
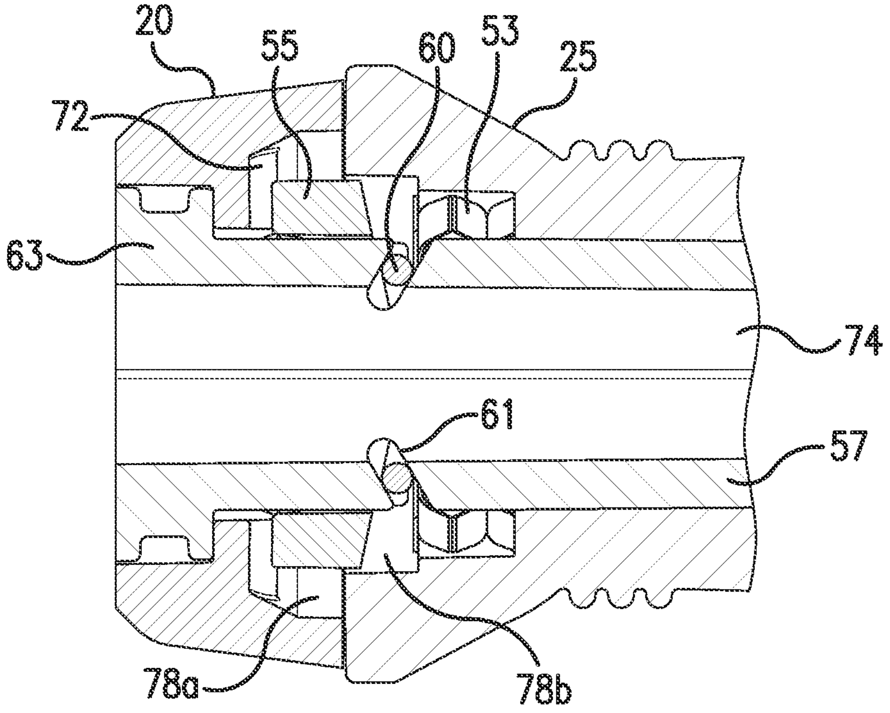
FIG. 11B is a cross sectional view of a screwdriver blade locking mechanism in a second position according to an embodiment.

Referring now to FIG. 8B, there is a locking cam 55 comprising cam surfaces 70, flat surfaces 64*a*, 64*b*, a plurality of spaced apart flat surfaces 76*a*, 76*b*, 76*c* and a central orifice 73 which is coaxial to channel 74 of blade lock 57 and orifice 71 of dial 20. Locking cam 55 may also include a grooved surface 75 configured to mesh with grooves 67 of blade lock 57 upon assembly as shown in FIGS. 7A and 7B. In some embodiments, the plurality of flat surfaces are spaced apart circumferentially by about 120 degrees to allow for debris to fall into debris gaps 78*a*, 78*b* as shown in FIGS. 11A and 11B.

Figure 9A:
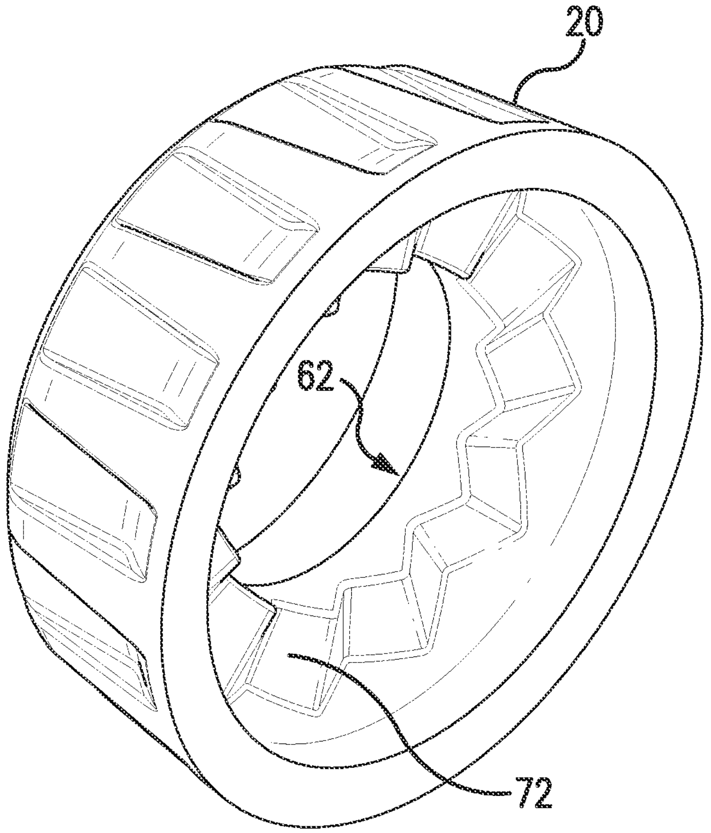
FIG. 9A is a perspective view of the 360-degree rotatable dial of FIG. 8A according to certain embodiments.
Figure 9B:
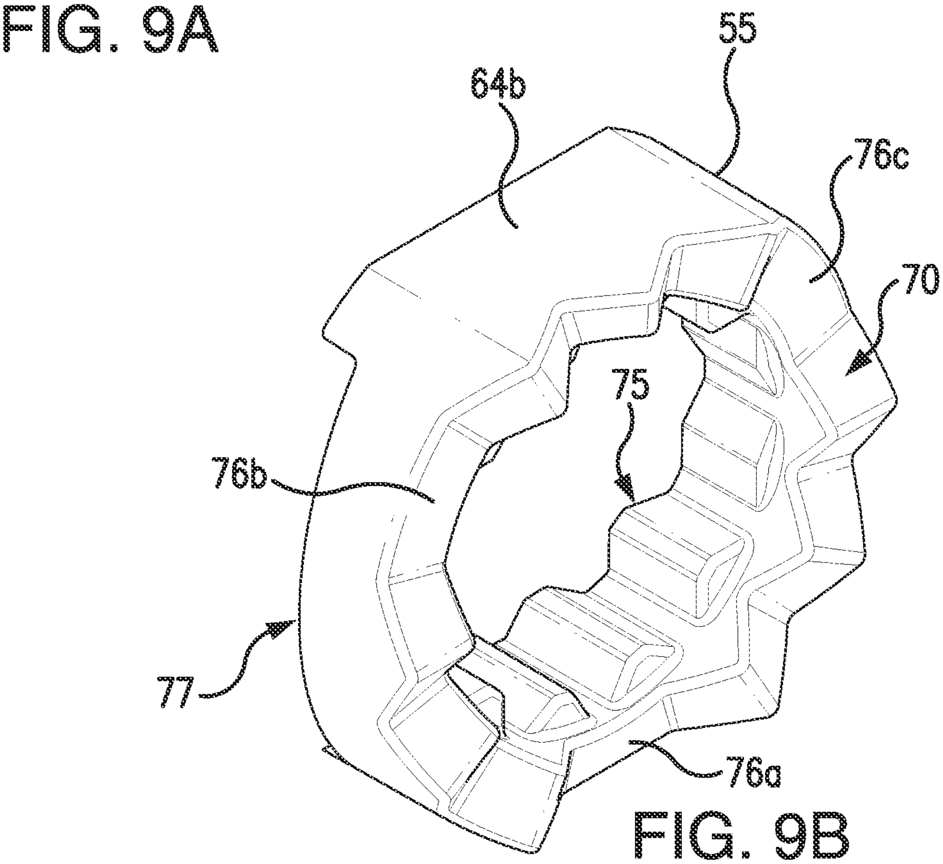
FIG. 9B is a perspective view of the locking cam of FIG. 8B according to an embodiment.

Referring now to FIGS. 9A and 9B, there is a perspective view of the 360-degree rotatable dial 20 of FIG. 8A also showing recess 62 according to certain embodiments and a perspective view of the locking cam 55 showing grooved surface 75 of FIG. 8B according to an embodiment. Further, FIG. 8B shows recess portion 77, flat surface 64*b* of cam 55 and the plurality of flat surfaces 76*a*, 76*b* and 76*c* spaced apart.

Referring now to FIGS. 10A and 10B, there is a perspective view of a combination of the 360-degree rotatable dial 20 with the locking cam 55 disposed fully inserted into the rotatable dial 20 while illustrating recess portion 77, flat surface 64*b* and gap 78*a* according to certain embodiments. In FIG. 10B there is a perspective view of a combination of the 360-degree rotatable dial 20 with the locking cam 55 partially inserted into the rotatable dial 20 according to an embodiment. It should be appreciated that cam lock 55 is undersized when compared to dial 20 to allow for clearances discussed above and upon rotation of dial 20 to provide additional clearances.

Referring now to FIG. 11A, there is a cross sectional view of the locking mechanism 19 in the second (locking) position corresponding to a locked position in which lock pins 60 engage the annular lock grooves 34*a*, 34*b* disposed in blade member 30. In FIG. 11B there is the locking mechanism 19 in the first position corresponding to an unlocked position in which lock pins 60 disengage the grooves 34*a*, 34*b* disposed in blade member 30 according to an embodiment. In FIG. 11A, there are lock pins 60 disposed within channel 74 to engage grooves 34*a*, 34*b* of blade member 30 upon insertion of blade member 30, with the peaks and valleys of the cam surfaces 70, 72 of dial 20 and cam lock 55 respectively meshing to allow the bias force of the spring 53 to drive the pins 60 deeper within angled slots 61 of blade lock 57 as shown. In FIG. 11B, lock pins 60 are removed from channel 74, and thus cannot engage grooves 34*a*, 34*b* of blade member 30 upon removal of blade member 30, by engagement of the peaks on the cam surfaces 70, 72 which create axial forces caused by the rotation of dial 20 which compresses the spring 53 axially towards handle 15 and forcing the pins 60 to move radially outwardly in the angled slots 61 of blade lock 57 as shown. FIGS. 11A and 11B also illustrate debris gaps 78*a* disposed along a circumferential side of cam lock 55 and debris gap 78*b* disposed between cam lock 55 and spring 53. Debris gaps 78*a*, 78*b* are configured to allow debris from surfaces 70, 72 to fall therein while rotating dial 20 via the clearances at 64*a*, 64*b*, 76*a*, 76*b* and 76*c* of cam lock 55 as a self-cleaning feature of the invention.

It should be appreciated that dial 20, cam lock 55, blade lock 57, pins 60, angled slots 61 and biasing spring 53 all can be combined to create the rotatable dial locking mechanism 19 which holds blade member 30 in a first operable position. Further, it should be appreciated that the ejector members 50*a*, 50*b*, the ejector housings 52*a*, 52*b* and biasing springs 45*a* and 45*b* all can be combined to create the ejection mechanism 41 which urges blade member 30 to a second inoperable position.

In operation, a user may choose an appropriate blade member 30 for a job, electrical or otherwise. Next, the user may rotate dial 20 relative to the remainder of the screwdriver 10 to create axial forces between cam surfaces 70, 72 causing cam lock 55 to move rearward in the direction of handle 15 to transfer axial force to pins 60 and spring 53 to urge pins 60 radially outwardly in the angled slots 61 causing pins 60 to be removed from physical interference with the channel 74 to allow the insertion of the chosen blade member 30 into housing 25 and handle 15. Now, the user may rotate dial 20 again so as to cause cam surfaces 70, 72 to relieve or reduce axial forces placed on pins 60 and spring 53 causing cam lock 55 to move away from handle 15 and causing pins 60 to move radially inwardly in the angled slots 61 and thereby have physical interference within the channel 74 to capture and lock the blade member 30 inserted therein by engaging one of the grooves 34*a*, 34*b*. When the job is completed or another tool head 32, 37, 38, 39 or 40 is required, the opposite operation may be performed to remove and/or flip blade member 30 to its opposing tool head, if needed. It should be appreciated that during the opposite operation, the ejection mechanism 41 will assist blade member 30 removal by urging blade member 30 out of channel 74. For example, springs 45*a* and 45*b* in combination with ejector members 50*a* and 50*b* urge blade member 30 at portion 36 axially out of channel 74 during the blade ejection process.

The invention claimed is:

1. A screwdriver device, comprising:
- a handle having an elongate channel;
- an axial blade member having a first distal end and a second distal end being configured and disposed for sliding through the elongate channel of the handle;
- a locking mechanism configured and disposed for releasably locking the axial blade member at a first operable position relative to the handle wherein the first distal end is exposed and the second distal end is disposed within the handle;
- a first tool head disposed on the first distal end of the axial blade member; and
- an ejection mechanism configured and disposed within the handle to constantly urge the axial blade member out of the locking mechanism from the first operable position to a second inoperable position.

2. The screwdriver device of claim 1, wherein the axial blade member includes insulation material.

3. The screwdriver device of claim 2, wherein the axial blade member is reversible and removable from the handle, and wherein the insulation material is ASTM rated for 1000V protection.

4. The screwdriver device of claim 1, wherein the axial blade member comprises an insulation layer and a core layer.

5. The screwdriver device of claim 1, wherein the locking mechanism comprises:
- a blade lock having an opening sized to allow sliding passage of the axial blade member therethrough;
- a rotatable dial disposed about an end of the blade lock where the dial includes cam surfaces configured and disposed to engage cam surfaces on a cam lock, the cam lock also disposed about the blade lock;
- at least one lock pin engaged with the blade lock for guided movement relative to the blade lock between a locking position and an unlocked position, the cam lock operably engaged with the at least one lock pin to urge the at least one lock pin from the locking position to the unlocked position in response to the rotation of the rotatable dial; and
- a biasing spring configured and disposed to bias the at least one lock pin toward the locking position.

6. The screwdriver device of claim 4, wherein the axial blade member includes at least one lock groove configured and disposed for receiving the at least one lock pin.

7. The screwdriver device of claim 4, wherein the cam lock is configured to allow debris to fall away from cam surface contact points into a gap disposed between the opposing cam surfaces of the cam lock and the rotatable dial when the rotatable dial is rotated past release of the cam surface contact points between the rotatable dial and the cam lock.

8. The screwdriver device of claim 1, wherein the ejection mechanism comprises:
- an ejector member configured and disposed to contact the axial blade member;
- a biasing spring operably engaged with the ejector member to bias the axial blade member in an axial direction out of the handle; and
- an ejector housing mounting the biasing spring and the ejector member within the handle.

9. The screwdriver device of claim 6, wherein the ejection mechanism further comprises:
- another ejector member configured and disposed to contact the axial blade member;
- another biasing spring operably engaged with the another ejector member to bias the axial blade member in the axial direction out of the handle; and
- another ejector housing mounting the another ejector member and the another biasing spring within the handle.

10. The screwdriver device of claim 1, wherein the locking mechanism comprises:
- a blade lock having an opening sized to allow sliding passage of the axial blade member therethrough; and
- at least one lock pin configured and disposed within the blade lock to engage and to release the axial blade member.

11. A screwdriver device, comprising:
- a handle having an elongate channel;
- an axial blade member having a first distal end and a second distal end being configured and disposed for sliding through the elongate channel of the handle;
- a first tool head disposed on the first distal end of the axial blade member; and
- a locking mechanism configured and disposed for releasably locking the axial blade member at a first operable position relative to the handle wherein the first distal end is exposed and the second distal end is disposed within the handle, wherein the locking mechanism comprises:

a blade lock having an opening sized to allow sliding passage of the axial blade member therethrough;

a rotatable dial disposed about an end of the blade lock where the dial includes cam surfaces configured and disposed to engage cam surfaces on a cam lock, the cam lock also disposed about the blade lock;

a lock pin engaged with the blade lock for guided movement relative to the blade lock between a locking position and an unlocked position, the cam lock operably engaged with the pin to urge the pin from the locking position to the unlocked position in response to the rotation of the rotatable dial; and a biasing spring configured and disposed to bias the lock pin toward the locking position.

12. The screwdriver device of claim 11, wherein the axial blade member includes insulation material where the insulation material comprises an insulation layer and a core layer.

13. The screwdriver device of claim 11, wherein the axial blade member further includes a second tool head disposed on the second distal end, and wherein the axial blade member is reversible and removable from the handle.

14. The screwdriver device of claim 11, further comprising a second lock pin operating in cooperation with the lock pin.

15. The screwdriver device of claim 11, wherein the insulation material is ASTM rated for 1000V protection.

16. The screwdriver device of claim 11, wherein the axial blade member includes at least one lock groove configured and disposed for receiving the lock pin.

17. A method of securing a blade to a screwdriver device, comprising:

providing a handle having an elongate channel;

providing an axial blade member having a first distal end and a second distal end being configured and disposed for sliding through the elongate channel of the handle, and a first tool head disposed on the first distal end of the axial blade member;

releasably locking the axial blade member at a first operable position relative to the handle wherein the first distal end is exposed and the second distal end is disposed within the handle; and constantly urging the axial blade member out of the elongate channel upon full insertion therein to cause ejection of the axial blade member from the handle upon release of the locking step.

18. The method of claim 17, further comprising latching the axial blade member at a lock groove disposed along its peripheral circumference.

19. The method of claim 17, wherein the axial blade member includes insulation material.

20. The method of claim 19, wherein the insulation material is ASTM rated for 1000V protection.

* * * * *